US011030293B2

(12) United States Patent
Rentachintala et al.

(10) Patent No.: US 11,030,293 B2
(45) Date of Patent: Jun. 8, 2021

(54) METHOD AND SYSTEM FOR CONFIGURABLE DEVICE FINGERPRINTING

(71) Applicant: Beijing Didi Infinity Technology And Development Co., Ltd., Beijing (CN)

(72) Inventors: Chandrasekhar Rentachintala, Mountain View, CA (US); Shengyong Deng, Mountain View, CA (US); Qingdi Liu, Mountain View, CA (US)

(73) Assignee: Beijing Didi Infinity Technology and Development Co., Ltd., Beijing (CN)

( * ) Notice: Subject to any disclaimer, the term of this patent is extended or adjusted under 35 U.S.C. 154(b) by 326 days.

(21) Appl. No.: 16/236,820

(22) Filed: Dec. 31, 2018

(65) Prior Publication Data

US 2020/0210559 A1 Jul. 2, 2020

(51) Int. Cl.

| G06F 21/32 | (2013.01) |
|---|---|
| G06F 21/43 | (2013.01) |
| H04L 29/06 | (2006.01) |
| H04W 12/06 | (2021.01) |
| H04W 12/30 | (2021.01) |

(52) U.S. Cl.
CPC .............. *G06F 21/32* (2013.01); *G06F 21/43* (2013.01); *H04L 63/0807* (2013.01); *H04L 63/0861* (2013.01); *H04L 63/0876* (2013.01); *H04L 67/42* (2013.01); *H04W 12/06* (2013.01); *H04W 12/30* (2021.01); *G06F 2221/2117* (2013.01)

(58) Field of Classification Search
CPC ..... H04W 12/06; H04W 12/30; H04W 12/68; H04W 12/69; H04W 12/71; H04L 63/00; H04L 63/0807; H04L 63/0876; H04L 9/3213
See application file for complete search history.

(56) References Cited

U.S. PATENT DOCUMENTS

| 9,430,787 | B2* | 8/2016 | Dezelak | G06Q 30/0601 |
|---|---|---|---|---|
| 9,503,452 | B1* | 11/2016 | Kumar | H04L 67/306 |
| 10,430,794 | B2* | 10/2019 | Hammad | G06Q 20/40 |
| 10,499,246 | B2* | 12/2019 | Li | H04L 63/1466 |
| 10,878,051 | B1* | 12/2020 | Holliday | G06F 16/2228 |

(Continued)

*Primary Examiner* — Richard A McCoy
(74) *Attorney, Agent, or Firm* — Kilpatrick Townsend & Stockton LLP

(57) ABSTRACT

Methods and systems for configurable device fingerprinting and/or achieving communications with enhanced security are disclosed herein. In one example embodiment, a method of configurable device fingerprinting includes storing, at a server, first information regarding one or more selected system attributes, and further includes receiving, at the server, a first signal requesting that a first client device be registered and including system information pertaining to the first client device. Also, the method includes extracting, from the system information, relevant portions of the system information corresponding to the one or more selected system attributes, where the server determines a fingerprint of the first client device based at least in part the relevant portions. Additionally, the method includes generating a first identifier pertaining to the first client device at least indirectly in response to the extracting of the relevant portions, and sending the first identifier for receipt by the first client device.

19 Claims, 3 Drawing Sheets

(56) References Cited

U.S. PATENT DOCUMENTS

| | | | | |
|---|---|---|---|---|
| 2005/0108551 | A1* | 5/2005 | Toomey | G06F 21/33 |
| | | | | 713/185 |
| 2010/0333213 | A1* | 12/2010 | Etchegoyen | G06F 21/105 |
| | | | | 726/29 |
| 2016/0142858 | A1* | 5/2016 | Molinet | H04W 4/60 |
| | | | | 709/203 |
| 2017/0195319 | A1* | 7/2017 | Gerber | G06Q 20/382 |
| 2018/0295133 | A1* | 10/2018 | Xu | H04W 12/71 |
| 2019/0363886 | A1* | 11/2019 | Atwood | H04W 12/06 |
| 2020/0106612 | A1* | 4/2020 | Baba | H04W 12/009 |
| 2020/0162450 | A1* | 5/2020 | Yarabolu | H04L 63/18 |

* cited by examiner

METHOD AND SYSTEM FOR CONFIGURABLE DEVICE FINGERPRINTING

CROSS-REFERENCE TO RELATED APPLICATIONS

N/A

STATEMENT REGARDING FEDERALLY SPONSORED RESEARCH OR DEVELOPMENT

N/A

FIELD

The present disclosure relates to computer systems employing multiple intercommunicating devices such as cloud-based systems, and more particularly to methods and systems for identifying or fingerprinting devices that are included by such computer systems.

BACKGROUND

Endpoint devices are internet-capable hardware devices connected to a network. Endpoint devices can include for example computers (e.g., desktop, laptop, or tablet computers, or mobile devices) and other computerized devices such as printers. Endpoint devices are not necessarily limited to "smart" devices but rather can in some cases include "dumb" devices (e.g., card readers, door locks, etc.). It is typically expected that endpoint devices comply with specific criteria before being granted access to a network.

Cloud-based endpoint protection employs an endpoint protection (EPP) cloud and one or more agents that are respectively installed on one or more corresponding endpoint devices, respectively. Activity of the endpoint devices can be monitored by a security operations center (SOC) user, which can also issue security policies to endpoint devices, and collect data if needed. Endpoint fingerprinting can be used in monitoring and controlling network access of endpoint devices.

In at least some conventional manners of implementing endpoint fingerprinting, the internet protocol (IP) addresses and/or media access control (MAC) addresses of endpoint devices are stored in the cloud, and access of a given endpoint device with respect to the network can be governed based upon whether that endpoint device has an IP address, or MAC address, or other attribute (e.g., a "fingerprint") that matches one of the stored IP addresses and/or MAC addresses.

Notwithstanding the existence of such endpoint fingerprinting techniques, such conventional techniques can be limited in certain respects. For example, a problem can occur when deploying endpoint fingerprinting in workplaces where the same attribute is shared by multiple devices. In some such circumstances, an endpoint device that should be granted access may be blocked from access.

Therefore, it would be advantageous if one or more new or improved methods or systems for fingerprinting (or otherwise identifying) devices could be developed that largely or entirely overcame one or more of the aforementioned limitations associated with conventional techniques, and/or avoided or overcame one or more other disadvantages, and/or provided one or more other advantages.

SUMMARY

In at least one example embodiment, the present disclosure relates to a method of configurable device fingerprinting. The method includes storing, at a server, first information regarding one or more selected system attributes, and further includes receiving, at the server, a first signal requesting that a first client device be registered and including system information pertaining to the first client device. Also, the method includes extracting, from the system information, relevant portions of the system information corresponding to the one or more selected system attributes, where the server determines a fingerprint of the first client device based at least in part the relevant portions. Additionally, the method includes generating a first identifier pertaining to the first client device at least indirectly in response to the extracting of the relevant portions, and sending the first identifier for receipt by the first client device.

Additionally, in at least one further example embodiment, the present disclosure relates to a method of configurable device fingerprinting and achieving communications with enhanced security. The method includes operating a server to extract, from system information pertaining to a first client device, relevant portions of the system information corresponding to a selected combination of one or more system attributes, where the server determines a fingerprint of the first client device based at least in part the relevant portions. Also, the method includes generating a first identifier pertaining to the first client device based at least in part, and at least indirectly upon, the relevant portions, and sending the first identifier from the server for receipt by the first client device. Further, the method includes receiving a first token request at least indirectly from the first client device, where the first token request includes one or more of the relevant portions, the fingerprint, and the first identifier, generating a first token in response to the first token request, and sending the first token from the server for receipt by the first client device, whereby the communications are at least partly secured by the first token.

Further, in at least one additional example embodiment, the present disclosure relates to a system for device fingerprinting and achieving communications with enhanced security. The system includes a server computer comprising at least one processing device and at least one memory device coupled at least indirectly with the at least one processing device. The server computer is operable as a server and is configured to receive from a user interface device, and store, first information regarding a selected combination of one or more system attributes. Also, the server computer is configured to extract, from system information pertaining to the first client device, relevant portions of system information corresponding to the selected combination of one or more system attributes, where the server determines a fingerprint of the first client device based at least in part the relevant portions. Additionally, the server is configured to generate a first identifier pertaining to the first client device based at least in part, and at least indirectly upon, the relevant portions. Further, the server is configured to send the first identifier from the server for receipt by the first client device, and to receive a first token request at least indirectly from the first client device, where the first token request includes one or more of the relevant portions, the fingerprint, and the first identifier. Additionally, the server is configured to generate a first token in response to the first token request, and to send the first token from the server for receipt by the first client device, whereby the communications are at least partly secured by the first token.

DETAILED DESCRIPTION

In at least some embodiments encompassed herein, the present disclosure relates to methods of operation of endpoint protection (EPP) systems that involve configurable device fingerprinting or identification. In at least some such embodiments, the methods can involve one or more of registering one or more endpoint devices, which can be client devices on which is operating agent software, authentication of such endpoint devices, re-registration of such endpoint devices, and/or generating fingerprints or identification information for such endpoint devices. Further, any of a variety of combinations of numerous different types of device information can be selected as the device's fingerprint (e.g., by a customer or client).

Additionally, in at least some embodiments, to achieve registration of an agent associated with a client device, the agent can send device information to a server, and the server in response can generate and return to the agent a universal identifier for that agent (e.g., an "agentUuid"). A new record with the agentUuid and the associated device information will be saved on the server. More particularly, during this process, the server can extract the device fingerprint from the device information sent by the agent and check if the fingerprint has been associated with any existing agent. If yes, the agentUuid of the existing agent can be returned to endpoint agent. If not, a new agentUuid can be created, and a record with the new agentUuid and device fingerprint will be on the server. In at least some circumstances, a customer is allowed to update the fingerprint definition for a given agent or associated client device.

Further, in at least some additional embodiments encompassed herein, there can be communications between the server (or cloud) and the agent devices that involve requesting and renewing access tokens by which communications between the agents and server are secured. When a given token expires, the agent will send the agentUuid together with device information to the server to request a new token. In particular, in the process of renewing a token, the server can check if the agentUuid and the device fingerprint from the agent are the same as the record saved on the server. If yes, a new token can be issued. If not, an error can be returned to the agent, and the agent can register the device with a new fingerprint.

Figure 1:
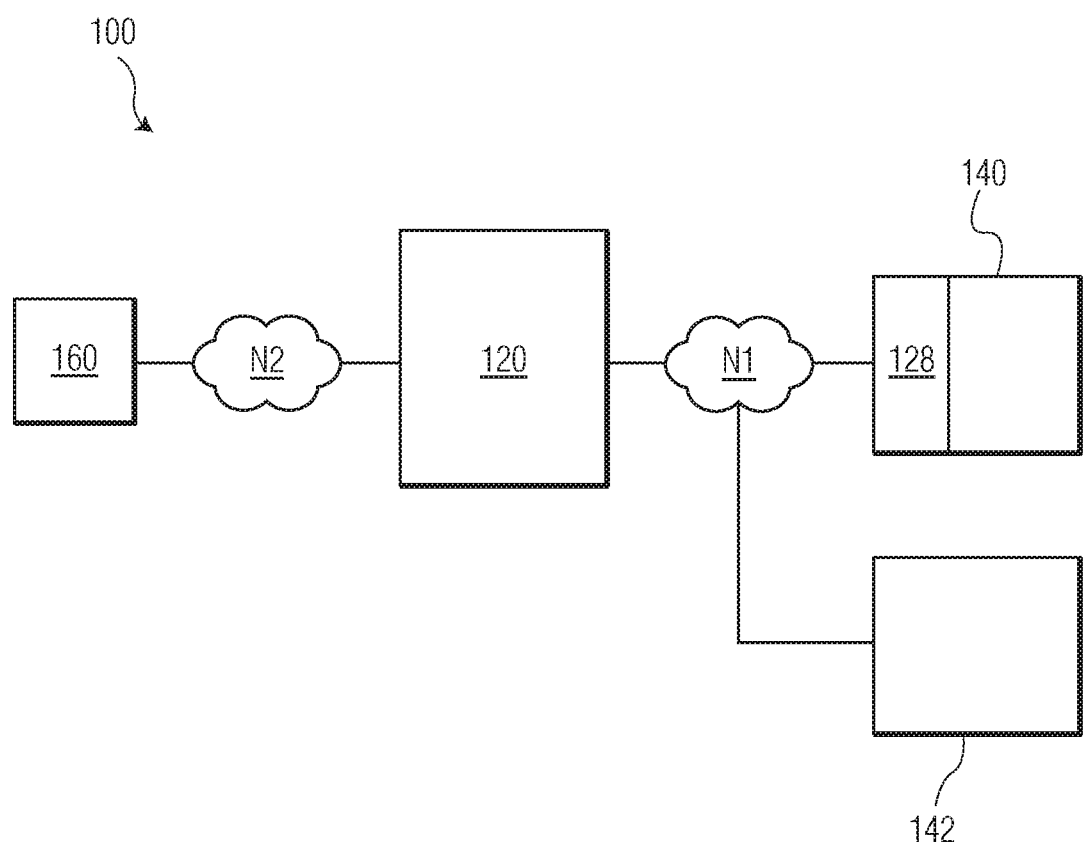
FIG. 1 is a block diagram of a system that is an endpoint protection (EPP) system in accordance with an example embodiment of the present disclosure.

Referring to FIG. 1, a block diagram shows a system 100 that is in accordance with an example embodiment encompassed herein and that, in the present embodiment, is an endpoint protection (EPP) system that employs one or more endpoint fingerprinting methods as described further below. In the present embodiment, the system 100 can include a server 120, a client device 140 that can connect to and be in communication with the server 120 over a network N1, and a user interface device 160 that can connect to and be in communication with the server 120 over a network N2. Additionally as shown, the client device 140 can include an agent application 128 running on a processor of the client device and used to facilitate communication between the server 120 and/or the user interface device 160.

It should be appreciated that the server 120 is able to communicate with more than one client device and often will be configured for and in communication with many client devices (e.g., hundreds or more). Accordingly, the system 100 also is shown to include a second, additional client device 142 that also can connect to and be in communication with the server 120 via the network N1. Further in this regard, it should be understood that the presence of the additional client device 142 in FIG. 1 is intended to be representative of the possible presence of any arbitrary number of one or more client device(s) in the system 100 (including an embodiment or circumstance in which only a single client device, such as the client device 140, is present in the system).

In view of the above description, it will be appreciated that the system 100 takes the form of a client-server system in which the client devices 140 and 142 are coupled to and in communication with the server 120. Accordingly, each of the client devices 140, 142 generally is respectively configured to engage in communications with the server 120 by which the respective client devices contact the server to obtain information, data, or services, and the server can respond to those requests, including by providing information, data, or services to the respective client devices making the respective requests. The server 120 can be understood to include or take the form of a server computer system or device that operates in accordance with programming allowing the server to respond to requests from, provided services to, and otherwise interact with, client devices such as the client devices 140 and 142. Although illustrated as a single structure, it should be understood that the server 120 can be provided by way of, or include or take the form of, one or more server computers (e.g., multiple computers or a distributed system).

In the present embodiment in which the system 100 is an EPP system, the client devices 140 and 142 (and any other client devices) can be considered to be endpoint devices. In addition, not only is the system 100 an EPP system but also the system can be considered a security operations center (SOC) computer system. As will be described in further detail, the server 120 in the present embodiment particularly can include software or programming allowing the server computer to serve as a security agent backend server. Further, each of the client devices 140 and 142 can be computers having security agent software or programming provided thereon, such as the agent application 128, and accordingly can be considered agent computers. Each of the client devices 140, 142 can include, but is not limited to, a personal computing device, a mobile phone, a tablet, and a vehicle mounted processor, among others.

It will be appreciated that, in accordance with the present embodiment in which the system 100 is an EPP system, each of the client devices 140 and 142 (any other client devices) that is a respective endpoint device can include a respective plurality of attributes, which may be used by the EPP system 100 to identify the respective endpoint (client) device. The respective attributes of any of the respective endpoint devices can include, but need not be limited to, a basic input/output system universal unique identifier (biosUuid), an operating system product identification number (osProductId), a system serial number, a harddisk serial number, a media access control (MAC) address (or MAC addresses), an internet protocol (IP) address (or IP addresses), and/or a hostname. It should additionally be appreciated that one or more of these attributes may be shared by two or more endpoint devices connectable to a given network. One attribute, alone, may therefore be insufficient to identify a given one of the endpoint (client) devices. Therefore, in accordance with at least some embodiments encompassed herein, a combination of such attributes is therefore generally selected for identifying each given one of the endpoint devices corresponding to the respective client devices 140 and 142 (or other client devices).

As mentioned above, the user interface device 160 also is in communication with the server 120. In the present embodiment of the system 100, in which the system 100 is a SOC computer system, the user interface device 160 can access and control security operations systems on the server 120 that access and control backend operations of the server 120. Thus, although shown in FIG. 1 as being distinct from and coupled to the server 120 by way of the network N2, the user interface device 160 can be considered to be part of, or to be integrated with the server 120. Indeed, the user interface device 160 can be considered part of a server operation system that also encompasses the server 120. The user interface device 160 can include, for example, a remote terminal connected to the server 120 (e.g., a personal computing device, a mobile phone, and a tablet, among others). Although not shown in FIG. 1, it should be appreciated that, in other embodiments, one or more additional user interface devices in addition to the user interface device 160 can also be present as part of the system 100 and be coupled to and in communication with the server 120 (for example, also by way of the network N2).

The networks N1 and N2 of FIG. 1 are intended to be representative of any of a variety of wireless and/or wired networks or communication links. The networks N1 and N2 can be two different types of networks or communication links, or be of the same type. Although shown to be two distinct networks or communication links in FIG. 1, the networks N1 and N2 can also be, or share in common, one or more network portions or communication link(s). More particularly, either or both of the networks N1 and N2 can take the form of, or include, an intranet or private network, or one or more proprietary communication links. For example, to the extent that the user interface device 160 is integrated with the server 120 the network N2 can take the form of a direct bus connection. Also for example, one or both of the networks N1 and N2 can be part of the Internet (or, alternatively, the World Wide Web).

Also for example, either of both of the networks N1 and N2 can employ any of a variety of networks, communication links, or associated technologies including, for example, a cellular network, a local area network (LAN), a wide area network (WAN), a wireless local area network (WLAN), Wi-Fi communication links or access points, a metropolitan area network (MAN), a public telephone switched network (PSTN), a Bluetooth network, a ZigBee network, a near field communication (NFC) network, a cable network, a wireline network, an optical fiber network, a telecommunications network or the like, or any combination thereof.

Figure 2:
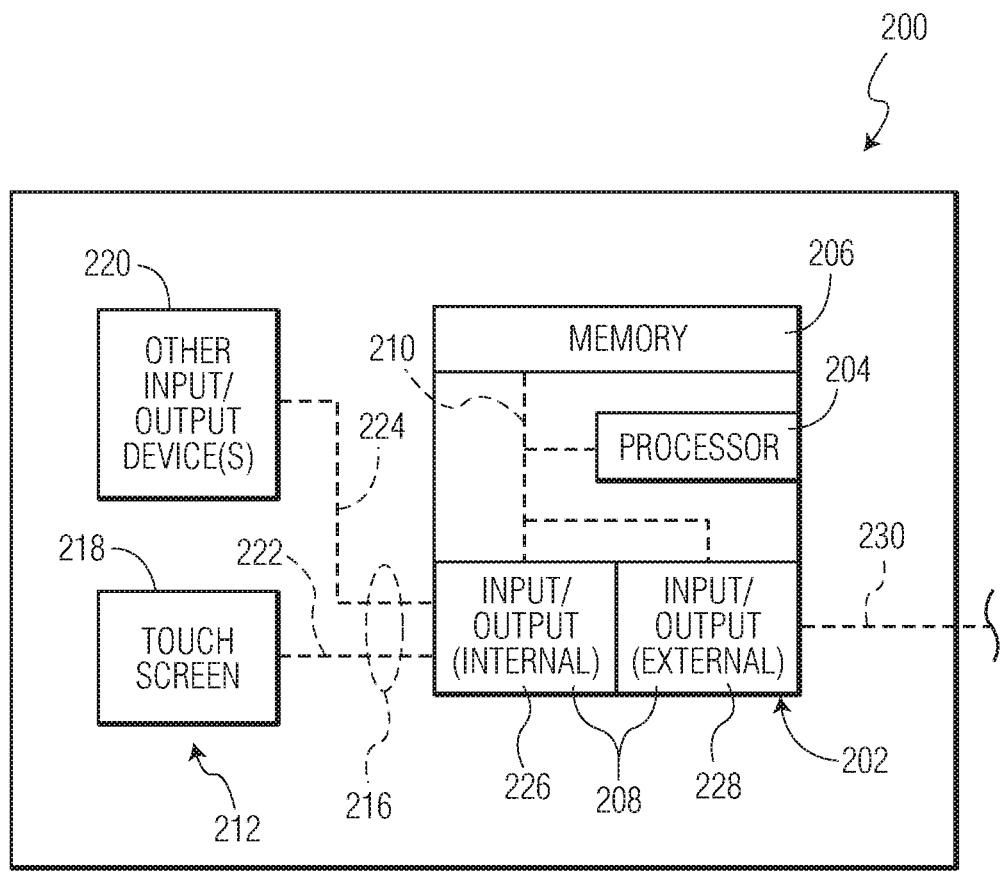
FIG. 2 is an additional block diagram showing in more detail portions of the system of FIG. 1.

Turning to FIG. 2, a block diagram is provided to illustrate example components of a computer 200. It should be appreciated that, in at least some embodiments, each of the server 120 (or the server computer operating as the server 120), the client devices 140 and 142, and the user interface device 160 can take the form of the computer 200. That is, the computer 200 is intended to be representative of at least one embodiment of each of the server 120, the client devices 140 and 142, and the user interface device 160. Again, however, it should be appreciated that the computer 200 is merely an example computer and the components shown as being included in the computer 200 are merely example components.

In the representation of FIG. 2, the computer 200 is shown to have a central portion 202 that includes each of a processor 204, a memory 206, and one or more input/output port(s) 208. Each of the processor 204, the memory 206, and the one or more input/output port(s) 208 are in communication with one another, directly or indirectly, by way of one or more internal communication link(s) 210, which can include wired or wireless links depending upon the embodiment. In at least some such embodiments, the internal communication link(s) 210 can take the form of a bus.

More particularly with respect to the processor 204, it should be appreciated that the processor 204 is intended to be representative of the presence of any one or more processors or processing devices, of any of a variety of forms. For example, the processor 204 is intended to be representative of any one or more of a microprocessor, a central processing unit (CPU), a controller, a microcontroller unit, an application-specific integrated circuit (ASIC), an application-specific instruction-set processor (ASIP), a graphics processing unit (GPU), a digital signal processor (DSP), a field programmable gate array (FPGA), a programmable logic device (PLD), a physics processing unit (PPU), a reduced instruction-set computer (RISC), or the like, or any combination thereof. The processor 204 can be configured to execute program instructions including, for example, instructions provided via software, firmware, operating systems, applications, or programs, and can be configured for performing any of a variety of processing, computational, control, or monitoring functions.

Further, the memory 206 of FIG. 2 is intended to be representative of the presence of any one or more memory or storage devices, which can be employed to store or record computer program instructions (e.g., those of an operating system or application), data, or information of any of a variety of types. In accordance with the present disclosure, such memory or storage devices can particularly be employed to store any of a variety of types of software programming, applications, operating systems, data, or other information. Depending upon the embodiment, the memory 206 can include any one or more of a variety of types of devices or components (or systems) or forms of computer-readable media such as, for example, mass storage devices, removable storage devices, hard drives, magnetic disks, optical disks, solid-state drives, floppy disks, flash drives, optical disks, memory cards, zip disks, magnetic tape, volatile read-and-write memory, random access memory (RAM) (e.g., dynamic RAM (DRAM) or static RAM (SRAM), etc.), or read-only memory (ROM) (e.g., erasable or electrically-erasable programmable ROM (EPROM or EEPROM), etc.).

Although the computer 200 is shown in FIG. 2 as including the memory 206 as part of the computer, the present disclosure is also intended to encompass embodiments in which the memory 206 operates in combination with, or is replaced by, one or more remote memory devices. Such remote memory devices can include, for example, a cloud platform such as a public or private cloud. Further, even though the computer 200 is shown as including the processor 204, in other embodiments the computer can also communicate and interact with remote processing devices that can provide additional computational or other processing resources. Also, in some embodiments, the memory 206 and processor 204 can be integrated in a single device (e.g., a processor-in-memory (PIM)).

Additionally, in the representation provided in FIG. 2, the computer 200 is shown to include input/output devices 212 that are coupled to, for communication with, the central portion 202 by way of communication link(s) 216. In the present example embodiment, the input/output devices 212 include a touch screen 218 and one or more other input/output devices 220, and the communication links 216 include a first link 222 coupling the touch screen 218 with the central portion 202 and a second link 224 coupling the one or more other input/output devices 220 with the central portion. However, the input/output devices 212 shown in FIG. 2 are merely intended to serve as examples, and the present disclosure is intended to encompass numerous other embodiments of computers having any of a variety of different types, and numbers, of input/output devices including, for example, a keyboard, a mouse, a speaker, a microphone, or a monitor or other display, a temperature sensor, a vibration device, etc.

Further with respect to FIG. 2, the input/output ports 208 are shown to include each of internal input/output ports 226, by which the central portion 202 of the computer 200 is coupled to the input/output devices 212, as well as external input/output ports 228, which permit or facilitate communications between the computer 200 and one or more computers, computer systems, computer system components (not shown in FIG. 2). The internal input/output ports 226 particularly can be coupled to the input/output devices 212 by way of the communication links 216. Also, the external input/output ports 228 permit or facilitate communications between the computer 200 and other systems or devices (including remotely-located systems or devices) by way of one or more communication links 230, which can be wireless or wired communication links.

For example, if one supposes that the computer 200 is one of the client (or endpoint) devices 140 or 142, or the user interface device 160, the external input/output ports 228 can allow for and facilitate communications between the computer 200 and the server 120 (or vice versa), by way of the communication networks N1 or N2 described above in regard to FIG. 1, which in such example can constitute one or more of the communication links 230. Also for example, if one supposes that the computer 200 is the server 120 (or the server computer operating as the server 120), the external input/output ports 228 can allow for and facilitate communications between the computer 200 and the client (or endpoint) devices 140, 142 or the user interface device 160 by way of the communication network N1 or N2 described above in regard to FIG. 1, which in such example can constitute one or more of the communication links 230.

It should be appreciated that the external input/output ports 228 can include, depending upon the embodiment, one or more devices, such as one or more wireless transceivers or transponders, by which wireless communications can occur between the computer 200 and remote computer, computer systems, or computer system components, or other remote systems or devices, via the communication link(s) 230. Also, each of the internal input/output ports 226 and the external input/output ports 228 can be configured to suit the particular systems or devices with which those input/output devices are intended to communicate, and/or the communication link(s) by which such communication will take place. For example, the number and configuration of the internal input/output ports 226 can be suited to allow for appropriate communications between the central portion 202 and the input/output devices 212 that are particularly coupled to those internal input/output ports.

It should be appreciated that the computer 200 can take the form of, or be considered, a general purpose computer or a special purpose computer depending upon the embodiment. It can take any of a variety of forms including, for example, a personal computer, a desktop computer, or a user terminal, as well as any of a variety of types of mobile devices such as a smart phone, laptop computer, a tablet, a wearable, a personal digital assistant (PDA), etc. Although in one embodiment the computer system 100 can be a SOC computer system, which for example can be associated with a facility or enterprise, the present disclosure is intended to encompass computer systems that are, or that include one or more computers that are, provided or supported in vehicles or other systems.

Figure 3:
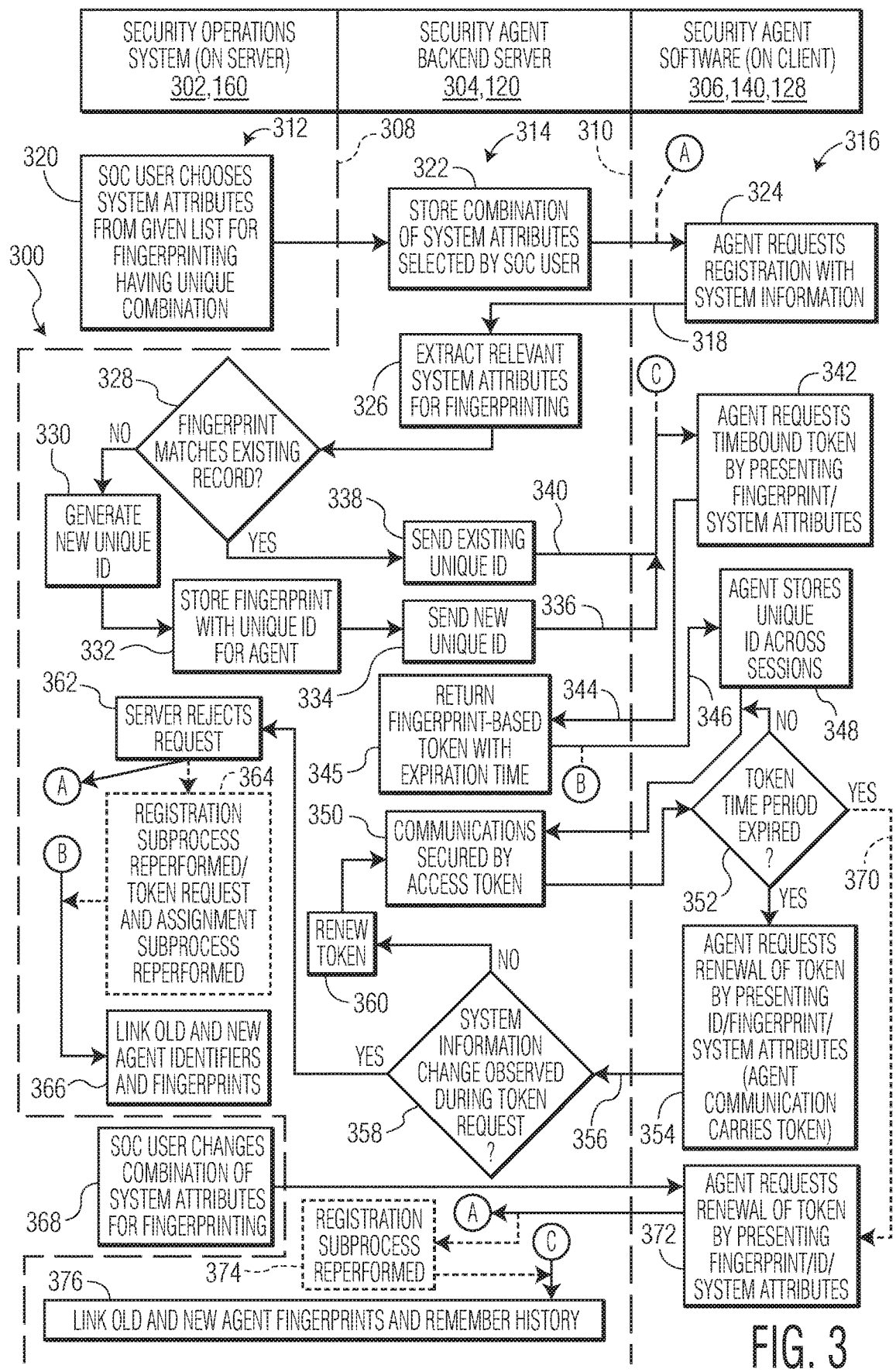
FIG. 3 is a flow diagram of a method for configurable device fingerprinting that can be performed by the system of FIG. 1 in accordance with an example embodiment encompassed herein.

Turning to FIG. 3, a flow chart (or flow diagram) is provided to show an improved method or process 300 that can be performed by the computer system 100 of FIG. 1, in accordance with an example embodiment encompassed herein. As will be described in further detail below, the method 300 allows for configurable device fingerprinting and can facilitate achieving of secure communications. The flow chart 300 particularly shows the method as including steps or operations performed by three actors (or entities) that are associated with the system 100 and that interact with one another, namely, a security operations system 302, a security agent backend server 304, and a security agent (or security agent software) 306. Steps performed by the security operations system 302 are shown in a first region 312 generally to the left of a first dashed line 308 (as shown in FIG. 3), steps performed by the security agent backend server 304 are shown in a second region 314 that is generally to the right of the first dashed line 308 and to the left of a second dashed line 310 (as shown in FIG. 3), and steps performed by the security agent 306 are shown in a third region 316 that is generally to the right of the second dashed line 310 (as shown in FIG. 3).

In the embodiment of FIG. 3, the security agent backend server 304 can be considered to be a process or application that is performed on the server 120 of FIG. 1, and the security operations system 302 can be considered to be a process or application that is performed on the user interface device 160. Nevertheless, it should be appreciated that in other embodiments the security agent backend server 304 and security operations system 302 can also be considered to be two processes or applications that are run independently (or substantially independently) from one another on the server 120 (or on one or more server computers operating as the server 120).

Further, with respect to FIG. 3, the security agent 306 can be considered to be or correspond to the agent application 128 performed by the client device 140 as described above. However, it should be recognized that the security agent 306 is intended to be representative of a process or application that is performed or run on any one or more client devices that can be in communication with the server 120, independently or substantially independently, and/or simultaneously or substantially simultaneously. That is, the security agent 306 can be software that (e.g., in separate instances) is implemented and run on the client device 140, also independently implemented and run on the client device 142, and also independently implemented and run on one or more other client devices. As explained above, it is particularly envisioned that, in at least some embodiments, the EPP system 100 is an endpoint system and will include many such client devices as endpoint devices.

Although the security agent 306 (e.g., in separate instances) can be implemented and run on each of the multiple different client devices, for purposes of the present explanation concerning FIG. 3 it will be assumed that the security agent 306 is associated with a particular one of the client devices, namely, the client device 140. Thus, for purposes of the present explanation, the flow chart 300 particularly illustrates a process involving steps performed by the security operations system 302 associated with the user interface device 160, the security agent backend server 304 associated with the server 120, and the security agent 306 (e.g., an instance of the security agent software or agent application 128) associated with the client device 140. Therefore, for purposes of the present explanation, the flow chart 300 particularly concerns interactions involving the user interface device 160, the server 120, and the client device 140.

In view of the above discussion, it will be appreciated that the system 100 of FIG. 1 in practice can and typically will perform the method or process of FIG. 3 multiple times simultaneously, with the multiple instances of the security agent 306 corresponding to different ones of the client devices (e.g., the client devices 140 and 142) simultaneously interacting with the security operations system 302 and security agent backend server 304. Such multiple simultaneous or substantially simultaneous (or concurrent) performances of the method of FIG. 3 in relation to the different instances of the security agent associated with the different client devices can be considered different instances of the method of FIG. 3. Although the discussion below particularly concerns a first instance of the method of FIG. 3 involving the instance of the security agent 306 associated with the client device 140, it should be understood that this discussion is equally applicable to other instances of the method of FIG. 3 that can involve other instances of the security agent associated with other client devices (e.g., the client device 142).

Still referring to FIG. 3, the method 300 begins at a step 320, at which a SOC user operating at or by way of the user interface device 160 (at the security operations system 302) chooses a plurality of system attributes that are to be used for client device identification or fingerprinting. Such attributes can include, but are not limited to, the basic input/output system universal unique identifier (biosUuid), operating system product identification number (osProductId), system serial number, harddisk serial number, MAC addresses, IP addresses, and/or hostname. In at least some embodiments, the SOC user can select the plurality of attributes from a list, which can (further for example) be provided by the security agent backend server 304, any arbitrary number or combination of attributes can be selected (albeit typically two or more attributes will be selected). The selected system attributes can have a unique combination. Subsequent to the selection of the system attributes, the combination of attributes selected by the SOC user is then stored on the security agent backend server 304, at a step 322.

To register a client (endpoint) device, the security agent 306 (again, which is installed on the client device) requests registration with the EPP system, at a step 324. The request for registration particularly is sent to the security agent backend server 304, as indicated by an arrow 318. It should be appreciated that, although the step 324 is shown as occurring subsequent to the steps 320, 322, in the present embodiment the security agent 306 determines when a registration request in accordance with the step 324 is made. That is, in the present embodiment (although not necessarily the case in alternate embodiments) the timing of a registration request is not particularly set or informed by the times at which any of the steps 320 or 322 are performed.

Upon receiving a registration request from the security agent 306, the security agent backend server 304 at a step 326 then extracts system attributes from the client (endpoint) device 140 associated with the security agent 306 making the registration request. The system attributes that are extracted correspond to the system attributes that were identified by the SOC user at the step 320, and the extracted system attributes can be considered a fingerprint of the client (endpoint) device 140 associated with the security agent 306. In alternate embodiments, a fingerprint of the client device 140 can instead be determined based at least partly upon (or derived from) one or more of the extracted system attributes. Additionally, in the present example embodiment, the security agent backend server 304 then further at a step 328 determines whether the extracted system attribute information matches any existing records.

If it is determined at the step 328 that there is not a match with any existing records, then at a step 330 the security agent backend server 304 generates a new unique identifier or unique ID (the "agentUuid") to be associated with the combination of attributes extracted from the endpoint device. Depending upon the embodiment, the new unique ID can be determined in any of a variety of manners including for example, based at least partly or at least indirectly upon the fingerprint (or one or more of the extracted system attributes), or by way of random generation. The new unique ID can be, but need not be, numerical, or alphanumerical.

Additionally, at a step 332, the extracted system attributes (again, the fingerprint of the client device 140) and the new unique ID are then saved to the security agent backend server 304. Further, at a step 334, the new unique ID (agentUuid) is transmitted to the client device 140 associated with the security agent 306 as represented by an arrow 336, and that new unique ID is saved to that client device, at which point that client device can be considered registered with the EPP system. Alternatively, if it is determined at the step 328 that there is a match, then in the present embodiment the security agent backend server 304 presumes that the client device 140 associated with the security agent 306 is already registered. Accordingly, at a step 338 the security agent backend server 304 sends a signal indicating that a unique ID has already been issued back to the client device 140, as represented by an arrow 340. In the present example embodiment, such a signal that is sent at the step 338 can include the already-assigned unique ID, although in other embodiments the unique ID need not be provided at the step 338.

Upon the client (endpoint) device 140 associated with the security agent 306 having a unique ID such that the client device is registered with the EPP system 100, that client device can send a signal to the security agent backend server 304 to request a time-limited (or timebound) access token, at a step 342. Such a token, upon being granted by the security agent backend server 304 can allow the client device 140 to access or proceed with communications via a network (or possibly more than one network). More particularly, to submit the request at the step 342, the security agent 306 installed on the client device 140 particularly presents or sends to the security agent backend server 304 its fingerprint and unique ID, as represented by an arrow 344. (Although the fingerprint of a client (endpoint) device is described above as being the system attributes of the client device as selected by the SOC user, in alternate embodiments the fingerprint can also be considered to be the combination of attributes as selected by the SOC user together with the unique ID.)

In the method 300 as shown in FIG. 3, at the time of the step 342 as illustrated, the fingerprint and recently-issued unique ID information that would be provided by the client device 140 is accurate and up-to-date. Accordingly, at a step 345, the security agent backend server 304 receives the token request, verifies the accuracy of the received fingerprint and unique ID information, and then as represented by an arrow 346 generates and returns to the client device 140 a fingerprint-based access token. As already noted above, in the present embodiment the access token will be a time-bound token and consequently the fingerprint-based token information sent to the client device 140 by the security agent backend server 304 will be accompanied by an expiration time. The step 345 can include the generation of a token in any of a number of manners (e.g., in a randomized manner or based upon some or all of the fingerprint or unique ID information).

Upon completion of the step 345, then the security agent 306 associated with the client device 140 stores the unique ID across all sessions, and can also store the received token (and associated time limit), at a step 348. Further, the client device 140 can then engage in communications with or via the secured agent backend server 304 as represented by a step 350, with such communications being secured by the access token. For example, the client device 140 can access a requested network using the token, without further authentication from the security agent backend server.

As indicated by a further step 352, the security agent 306 can monitor and determine whether a time period associated with the validity of a token (e.g., the token provided at the step 345) has expired. As illustrated, so long as the time period of the token has not expired, the method 300 cycles between the step 350 and 352, and accordingly communications secured or permitted by that token can continue. However, upon the expiration of the time period associated with the token as determined at the step 352, the method 300 advances to a step 354, at which the security agent 306 associated with the client device 140 requests a renewal of the token by sending a renewal request signal as represented by an arrow 356 to the security agent backend server 304. The renewal request signal sent by the security agent 306 at the step 354 particularly includes both the fingerprint (system attributes selected by the SOC user at the step 320) of the client device 140 and the unique ID ascribed to the client device 140. In this circumstance, the renewal request signal sent by the security agent 306 at the step 354 also includes the expired token.

Upon receiving the renewal request signal, the security agent backend server 304 at a step 358 next compares the received system (client device) information—namely, the received fingerprint (system attributes) and unique ID—with information stored at the security agent backend server itself, to determine whether any system information change has occurred. Such a change in system information could arise for example because of a change in one or more of the system attributes of the client (endpoint) device 140. If the security agent backend server 304 at the step 358 determines that no system information change has been observed as of the time of (e.g., during) the token renewal request, the security agent backend server can authenticate the client (endpoint) device 140 associated with the security agent 306 making the token renewal request. Accordingly, the security agent backend server 304 determines that renewal of the token is appropriate, and the method proceeds to a step 360, at which the token is renewed. Although not shown, it should be appreciated that the renewal of the token at the step 360 can include the sending of a signal from the security agent backend server 304 back to the security agent 306 indicating or confirming the renewal of the token. Upon the renewal of the token at the step 360 being granted, the method returns to the step 350, at which communications secured by the token can again proceed.

Alternatively, if at the step 358 it is determined that any of the system information has changed, then the security agent backend server 304 will be unable to authenticate the client (endpoint) device 140 associated with the security agent 306 making the renewal request, and will reject the request at a step 362. In this circumstance, the earlier steps of the method 300 of FIG. 3 relating to the subprocess of registration/unique ID assignment and the subprocess of token request/assignment are reperformed, as represented by a dashed block or step 364. More particularly as illustrated, upon rejecting the token renewal request at the step 362, the method 300 proceeds to a point A, which is just prior to the performing of the step 324. Accordingly, the method 300 then proceeds to perform (or re-perform) each of the steps 324, 326, 328, 330, 332, and 334 relating to the registration subprocess, including the steps pertaining to the extraction of system attributes, the generation and storing of a new unique ID, and the sending of that new unique ID to the security agent 306. It should be recognized that, during the performing of the registration subprocess involving the aforementioned steps, the step 338 will not be performed because the fingerprint should not match an existing record as determined at the step 328.

Further, upon completion of the step 334, then the method 300 performs (or re-performs) each of the steps 342 and 345 relating to the subprocess of requesting and assignment (or generation) of an access token and the providing of that access token to the security agent 306. Upon the completion of the step 345 at which the access token is returned to the security agent 306, the method 300 attains a point B such that, as illustrated, the method proceeds to a step 366. At the step 366, the security agent backend server 304 links and stores the old and new fingerprints and unique IDs that have been ascribed to the client (endpoint) device 140 associated with the security agent 306 (e.g., during the registration subprocess when initially performed, as well as when re-performed in accordance with the step 364). By linking and storing such old and new system information, the security agent backend server 304 is able to keep or maintain a history of the operation of the client device 140, particularly in terms of the accessing of a requested network or communication by way of a network by that client device. In some embodiments or circumstances, old and/or new access tokens assigned to the client device 140 (or security agent 306 associated therewith) can also be linked and stored.

The present disclosure and particularly the method 300 of FIG. 3 also envision that a SOC user can change a selected combination of system attributes that are indicative of a client (endpoint) device, as represented by a step 368. Indeed, it is possible that the user interface device 160 (or security operations system 302 associated therewith) can receive input or instructions from a SOC user at any given time to change the selected combination of system attributes, again for example through the selection of one or more attributes from a list. Often, or typically, this can occur when a given client device such as the client device 140 associated with the security agent 306 has already completed the registration subprocess, been assigned a unique ID, and also obtained an access token. If this occurs, nothing may occur in response to the changing of the selected system attributes until the time period of an access token currently-assigned to the client device 140 expires. When this occurs, for example as illustrated by a dashed arrow 370, the security agent 306 associated with the client device 140 will send a request to renew the token for receipt by the security agent backend server 304, at a step 372.

As described earlier in regard to the step 354, such a token renewal request can include the sending of fingerprint (or system attribute) information as well as the currently-ascribed unique ID of the client device 140 for receipt by the security agent backend server 304. Upon receiving this system information, the security agent backend server 304 will recognize that the fingerprint (or system attribute) information no longer matches, or no longer is appropriate in view of, the current combination of selected system attributes specified in the step 368. Consequently, the method 300 proceeds again to the point A, and performs again the registration subprocess including the steps 324, 326, 328, 330, 332, and 334, as also represented by a dashed block or step 374. By performing again this registration subprocess, again a new unique ID is generated and ascribed to the client device 140, based upon the fingerprint (system attribute) information in accordance with the specification provided at the step 368.

In the present illustration, after completion of the registration subprocess at a point C immediately following the step 334 (and corresponding completion of the step 374), the method 300 advances to a step 376. At the step 376, the security agent backend server 304 links and stores the old and new fingerprints and unique IDs that have been ascribed to the client (endpoint) device 140 associated with the security agent 306 (e.g., during the registration subprocess when initially or previously performed, such as in association with the step 364). As discussed in relation to the step 366, by linking and storing of old and new system information, the security agent backend server 304 is able to keep or maintain a history of the operation of the client device 140, particularly in terms of the accessing of a requested network or communication by way of a network by that client device. Also, in some embodiments or circumstances, old and/or new access tokens assigned to the client device 140 (or security agent 306 associated therewith) can also be linked and stored at the step 376.

Although not shown, it should be appreciated that the method 300 can continue on beyond either of the steps 366 or 376. For example, upon the performing of the step 366, the client device 140 is both registered (with a unique ID) and has an access token ascribed to it, and thus the client device 140 is able to conduct communications as secured by the access token. Thus, the method 300 can be understood to proceed from the step 366 back to the step 350. Also, with respect to the performing of the step 376, it can be understood that the security agent backend server 304 during this step renews the previously-assigned token in a manner identical or substantially similar to that of the step 360, and that the method 300 of FIG. 3 can then proceed again to the step 350 upon completion of this renewal. Alternatively, the registration subprocess associated with the step 374 can be followed by the generation and assignment of a new access token, after which the method can also proceed to the step 350.

In view of the above discussion, it should be appreciated that one or more advantages can be achieved by way of methods and systems involving configurable device fingerprinting and related subprocesses (e.g., involving token renewal, issuance, or reissuance) such as those described herein. For example, by performing configurable device fingerprinting in accordance with one or more of the improved systems and methods described herein, in which any of a number of different system attributes can be selected by a SOC user for determining the fingerprint of a client device, it becomes easier to identify and differentiate among a variety of client devices. This can be particularly helpful, for example, in a workplace setting in which multiple endpoint devices may share one or more particular attributes (but not others). Further, by virtue of one or more of the methods or systems described herein, it becomes possible to quickly and expediently issue and reissue unique identifiers (IDs) when system attributes change or when it becomes desirable or advantageous to identify or differentiate among client devices based upon different criteria or attributes.

Further, operation in accordance with or by one or more of the methods or systems described herein makes it possible for communications to be achieved by client devices in relation to a server or otherwise (e.g., by way of one or more networks) in a manner that achieves enhanced levels of security, or that permits a desired level of security to be maintained notwithstanding changes in fingerprinting or changes in how client devices are identified or recognized. At the same time, notwithstanding any of the above discussion or description concerning the providing of security, it should be appreciated that no system or method is absolutely secure, and nothing described herein should be understood as providing any representation or guaranty that any particular level of security will be provided by anything disclosed herein. Rather, security can depend upon a variety of factors that are beyond the scope of the present disclosure and it should be appreciated that, to achieve any particular level of security, further provision can be made to achieve such security in addition to any methods or systems described herein.

As already discussed above, the present disclosure is intended to encompass a variety of improved systems and methods. Also, the present disclosure is intended to encompass a variety of larger systems and methods that include, as parts of those systems and methods, components, devices, systems and methods of configuring systems for device fingerprinting and authorizing endpoint devices to access a requested network. Further, it should be appreciated that, although the flowchart descriptions provided with the present disclosure illustrate processes and process steps (or operations) that can be performed by one or more systems or devices according to some embodiments encompassed by the present disclosure, the present disclosure is intended to encompass modified versions of these processes and process steps (or operations). For example, in some other embodiments encompassed herein, one or more of the steps of the flowcharts shown and/or described can be performed in different orders than that shown, in inverted orders relative to what is shown, or at different relative times than what is described above. Further for example, even if two process steps are described above as occurring at different times, the present disclosure is intended to encompass other embodiments in which those process steps occur simultaneously, or vice-versa. Further, the present disclosure is intended to encompass embodiments in which one or more other operations may be added or omitted relative to the processes described above.

While the principles of the invention have been described above in connection with specific apparatus and method, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method of configurable device fingerprinting, the method comprising:

providing, by a server, a user interface comprising a list of selectable system attributes of a first client device that includes:
  a basic input/output system universal unique identifier (biosUuid) attribute;
  an operating system product identification number (osProductId) attribute;
  a system serial number;
  a hard disk serial number;
  a media access control (MAC) address;
  an internet protocol (IP) address; and
  a hostname;
rendering the list of selectable system attributes on the user interface;
receiving, from a second device via the user interface, a selection of at least three of the selectable system attributes to generate first information including respective values corresponding to the at least three of the selectable system attributes that correspond to the first client device,
wherein the at least three of the selected system attributes includes:
  the biosUuid;
  the osProductId; and
  at least one of:
    the system serial number;
    the hard disk serial number;
    the MAC address;
    the IP address; or
    the hostname;
storing, at the server, the first information;
receiving, at the server, a first signal requesting that a first client device be registered, the first signal including system information corresponding to the first client device;
determining a fingerprint of the first client device based on a matching of at least a portion of the system information with the stored first information;
generating a first identifier corresponding to the first client device based at least in part on the portion of the system information that matched the stored first information;
storing, by the server, the fingerprint and corresponding first identifier;
sending, by the server, the first identifier to the first client device;
receiving, by the server, a first token request that includes the first identifier and the system information;
verifying, by the server, the first token request by comparing the received first identifier and the received system information with the stored fingerprint and the stored first identifier; and
in response to the verification:
  determining that the first token request was sent by the first client; and
  sending a token to the first client,
    wherein subsequent communications between the first client and the server are secured using the token.

2. The method of claim 1, wherein the server is a security agent backend server, wherein the user interface is a security operations center (SOC) user interface, and wherein the first signal is received by the security agent backend server at least indirectly from security agent software operating on the first client device.

3. The method of claim 1,
wherein the first information is received from the user interface subsequent to the user interface receiving at least one input from a security operations center (SOC) user specifying the one or more selected system attributes, and
wherein the first identifier is a unique identifier, and wherein the unique identifier pertains to a security agent operating on the first client device.

4. The method of claim 1, further comprising:
receiving at the server a token renewal request signal after an expiration of a time limit associated with the first token, following the receipt by the first client device of the first token.

5. The method of claim 4, further comprising: after the token renewal request signal is received,
determining whether a change has occurred with respect to the system information pertaining to the first client device, such that either the matching portion or the fingerprint is no longer consistent with the changed system information.

6. The method of claim 5, further comprising, when it is determined that the change has occurred such that either the matching portion or the fingerprint is no longer consistent with the changed system information:
generating a second identifier pertaining to the first client device at least indirectly in response to extracting additional portions of the changed system information that match the stored first information;
generating and sending, for receipt by the first client device, a second token, in response to the receiving of a second token request signal, and
linking the second identifier with the first identifier.

7. The method of claim 5 wherein, when it is determined that the change has not occurred, the first token is renewed.

8. The method of claim 1, further comprising:
receiving, at the server, an additional signal concerning an instruction to replace the one or more selected system attributes with one or more modified selected system attributes;
receiving at the server a token renewal request signal after an expiration of a time limit associated with the first token,
extracting additional portions of the system information, corresponding to the one or more modified selected system attributes;
generating a second identifier pertaining to the first client device at least indirectly based upon the extracted additional portions of the system information; and
linking the second identifier with the first identifier.

9. A system comprising:
one or more processors;
one or more machine-readable, non-transitory storage mediums that include instructions configured to cause the one or more processors to perform operations including:
providing, by a server, a user interface comprising a list of selectable system attributes of a first client device that includes:
  a basic input/output system universal unique identifier (biosUuid) attribute;
  an operating system product identification number (osProductId) attribute;
  a system serial number;
  a hard disk serial number;
  a media access control (MAC) address;
  an internet protocol (IP) address; and
  a hostname;
rendering the list of selectable system attributes on the user interface;

receiving, from a second device via the user interface, a selection of at least three of the selectable system attributes to generate first information including respective values corresponding to the at least three of the selectable system attributes that correspond to the first client device,
wherein the at least three of the selected system attributes includes:
  the biosUuid;
  the osProductId; and
  at least one of:
    the system serial number;
    the hard disk serial number;
    the MAC address;
    the IP address; or
    the hostname;
storing, at the server, the first information;
receiving, at the server, a first signal requesting that a first client device be registered, the first signal including system information corresponding to the first client device;
determining a fingerprint of the first client device based on a matching of at least a portion of the system information with the stored first information;
generating a first identifier corresponding to the first client device based at least in part on the portion of the system information that matched the stored first information;
storing, by the server, the fingerprint and corresponding first identifier;
sending, by the server, the first identifier to the first client device;
receiving, by the server, a first token request that includes the first identifier and the system information;
verifying, by the server, the first token request by comparing the received first identifier and the received system information with the stored fingerprint and the stored first identifier; and
in response to the verification:
  determining that the first token request was sent by the first client; and
  sending a token to the first client,
    wherein subsequent communications between the first client and the server are secured using the token.

10. The system of claim 9, wherein the server is a security agent backend server, wherein the user interface is a security operations center (SOC) user interface, and wherein the first signal is received by the security agent backend server at least indirectly from security agent software operating on the first client device.

11. The system of claim 9, wherein the first information is received from the user interface subsequent to the user interface receiving at least one input from a security operations center (SOC) user specifying the one or more selected system attributes, and wherein the first identifier is a unique identifier, and wherein the unique identifier pertains to a security agent operating on the first client device.

12. The system of claim 9 wherein the instructions are further configured to cause the one or more processors to perform operations including:
  receiving at the server a token renewal request signal after an expiration of a time limit associated with the first token, following the receipt by the first client device of the first token.

13. The system of claim 12 wherein the instructions are further configured to cause the one or more processors to perform operations including:
  after the token renewal request signal is received, determining whether a change has occurred with respect to the system information pertaining to the first client device, such that either the matching portion or the fingerprint is no longer consistent with the changed system information.

14. The system of claim 12 wherein when it is determined that the change has occurred such that either the matching portion or the fingerprint is no longer consistent with the changed system information, the instructions are further configured to cause the one or more processors to perform operations including:
  generating a second identifier pertaining to the first client device at least indirectly in response to extracting additional portions of the changed system information that match the stored first information;
  generating and sending, for receipt by the first client device, a second token, in response to the receiving of a second token request signal, and
  linking the second identifier with the first identifier.

15. A non-transitory computer-program product tangibly embodied in a machine-readable non-transitory storage medium that includes instructions configured to cause one or more processors to perform operations including:
  providing, by a server, a user interface comprising a list of selectable system attributes of a first client device that includes:
    a basic input/output system universal unique identifier (biosUuid) attribute;
    an operating system product identification number (osProductId) attribute;
    a system serial number;
    a hard disk serial number;
    a media access control (MAC) address;
    an internet protocol (IP) address; and
    a hostname:
  rendering the list of selectable system attributes on the user interface;
  receiving, from a second device via the user interface, a selection of at least three of the selectable system attributes to generate first information including respective values corresponding to the at least three of the selectable system attributes that correspond to the first client device,
  wherein the at least three of the selected system attributes includes:
    the biosUuid;
    the osProductId; and
    at least one of:
      the system serial number;
      the hard disk serial number;
      the MAC address;
      the IP address; or
      the hostname;
  storing, at the server, the first information;
  receiving, at the server, a first signal requesting that a first client device be registered, the first signal including system information corresponding to the first client device;
  determining a fingerprint of the first client device based on a matching of at least a portion of the system information with the stored first information;
  generating a first identifier corresponding to the first client device based at least in part on the portion of the system information that matched the stored first information;
  storing, by the server, the fingerprint and corresponding first identifier;
  sending, by the server, the first identifier to the first client device;

receiving, by the server, a first token request that includes the first identifier and the system information;

verifying, by the server, the first token request by comparing the received first identifier and the received system information with the stored fingerprint and the stored first identifier; and in response to the verification:
   determining that the first token request was sent by the first client; and
   sending a token to the first client,
      wherein subsequent communications between the first client and the server are secured using the token.

16. The computer program product of claim 15, wherein the server is a security agent backend server, wherein the user interface is a security operations center (SOC) user interface, and wherein the first signal is received by the security agent backend server at least indirectly from security agent software operating on the first client device.

17. The computer program product of claim 15, wherein the first information is received from the user interface subsequent to the user interface receiving at least one input from a security operations center (SOC) user specifying the one or more selected system attributes, and
   wherein the first identifier is a unique identifier, and wherein the unique identifier pertains to a security agent operating on the first client device.

18. The computer program product of claim 15 wherein the instructions are further configured to cause the one or more processors to perform operations including:
   receiving at the server a token renewal request signal after an expiration of a time limit associated with the first token, following the receipt by the first client device of the first token.

19. The computer program product of claim 15 wherein the instructions are further configured to cause the one or more processors to perform operations including:
   after the token renewal request signal is received, determining whether a change has occurred with respect to the system information pertaining to the first client device, such that either the matching portion or the fingerprint is longer consistent with the changed system information.

* * * * *